Oct. 29, 1963    J. H. STEWARD    3,108,368
METHOD OF SIZING AND INSTALLING A PIERCE NUT IN A PANEL
Original Filed March 25, 1957    6 Sheets-Sheet 1
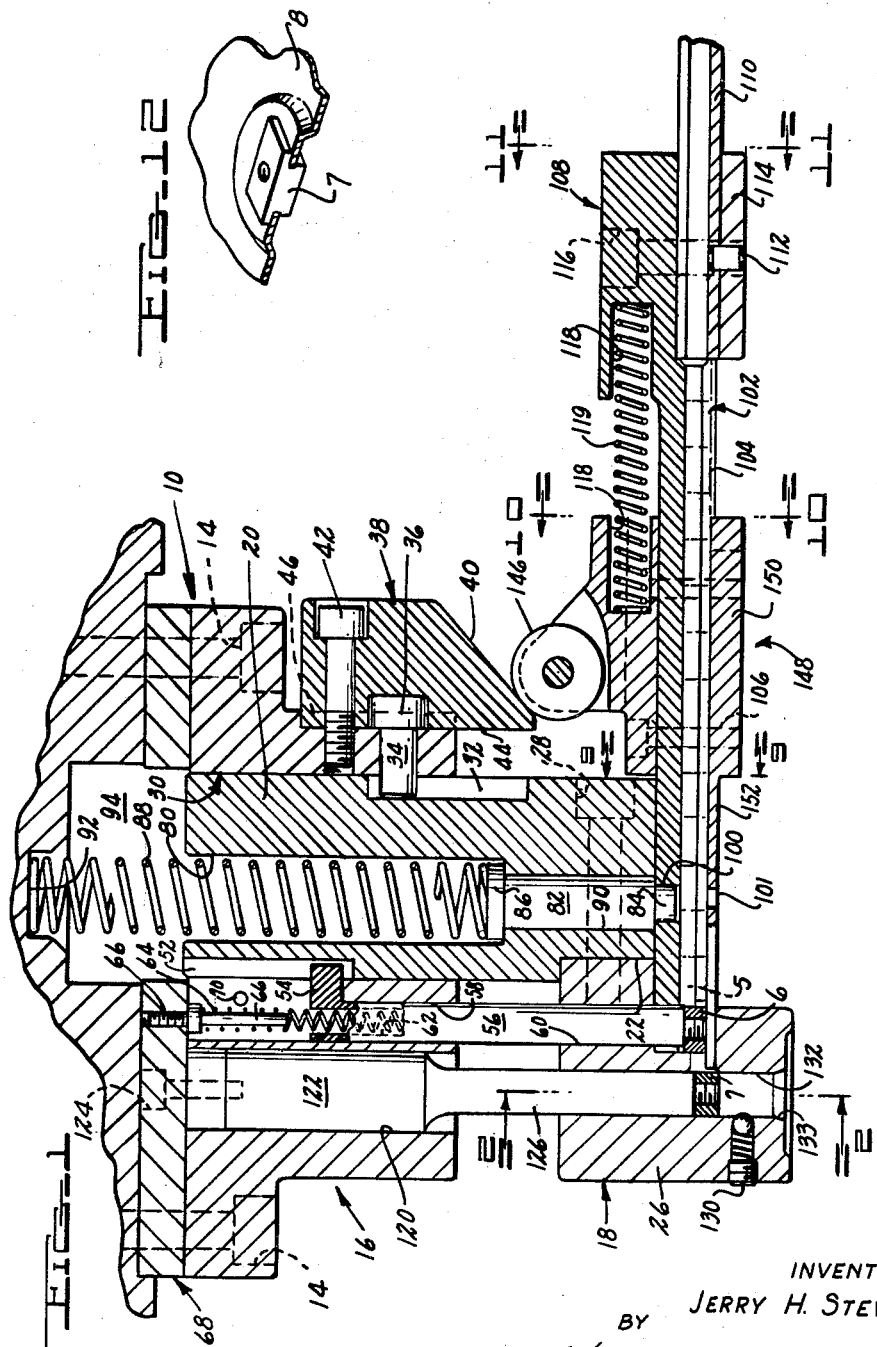
INVENTOR
JERRY H. STEWARD
BY
WILSON, SETTLE & CRAIG
ATTORNEYS

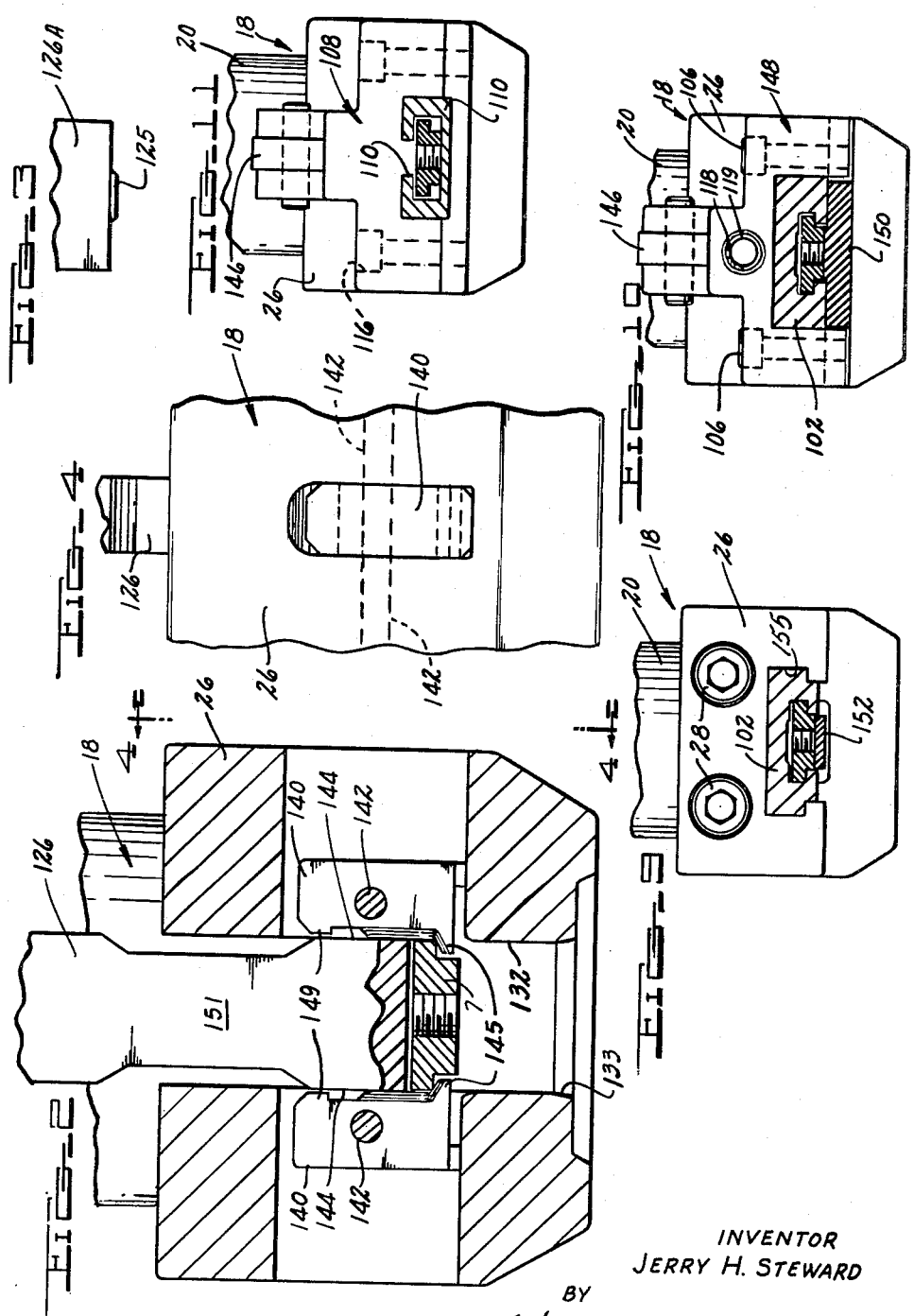

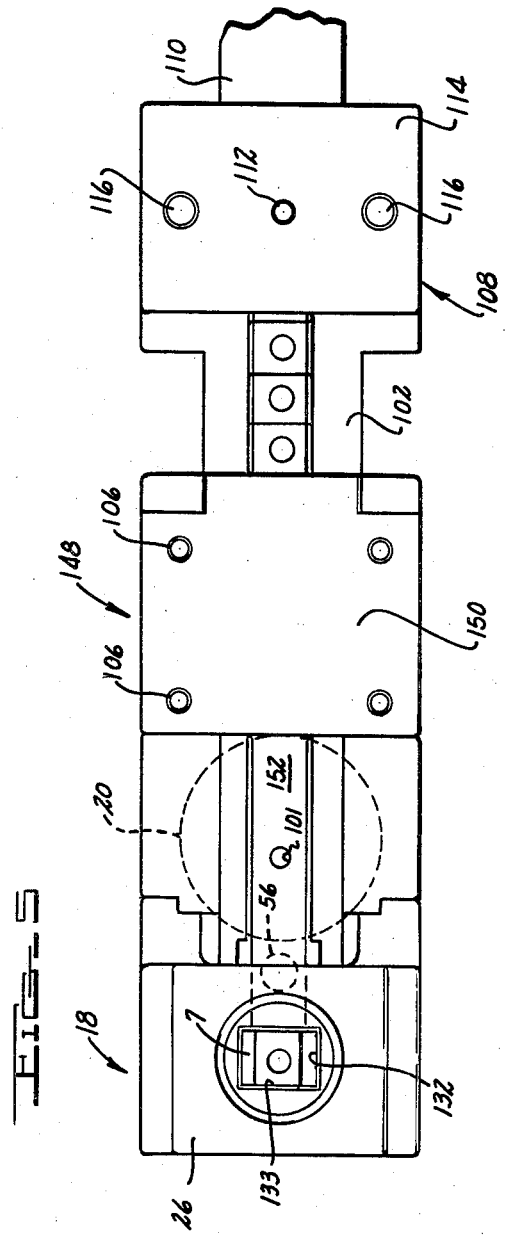
INVENTOR
JERRY H. STEWARD
BY
WILSON, SETTLE & CRAIG
ATTORNEYS

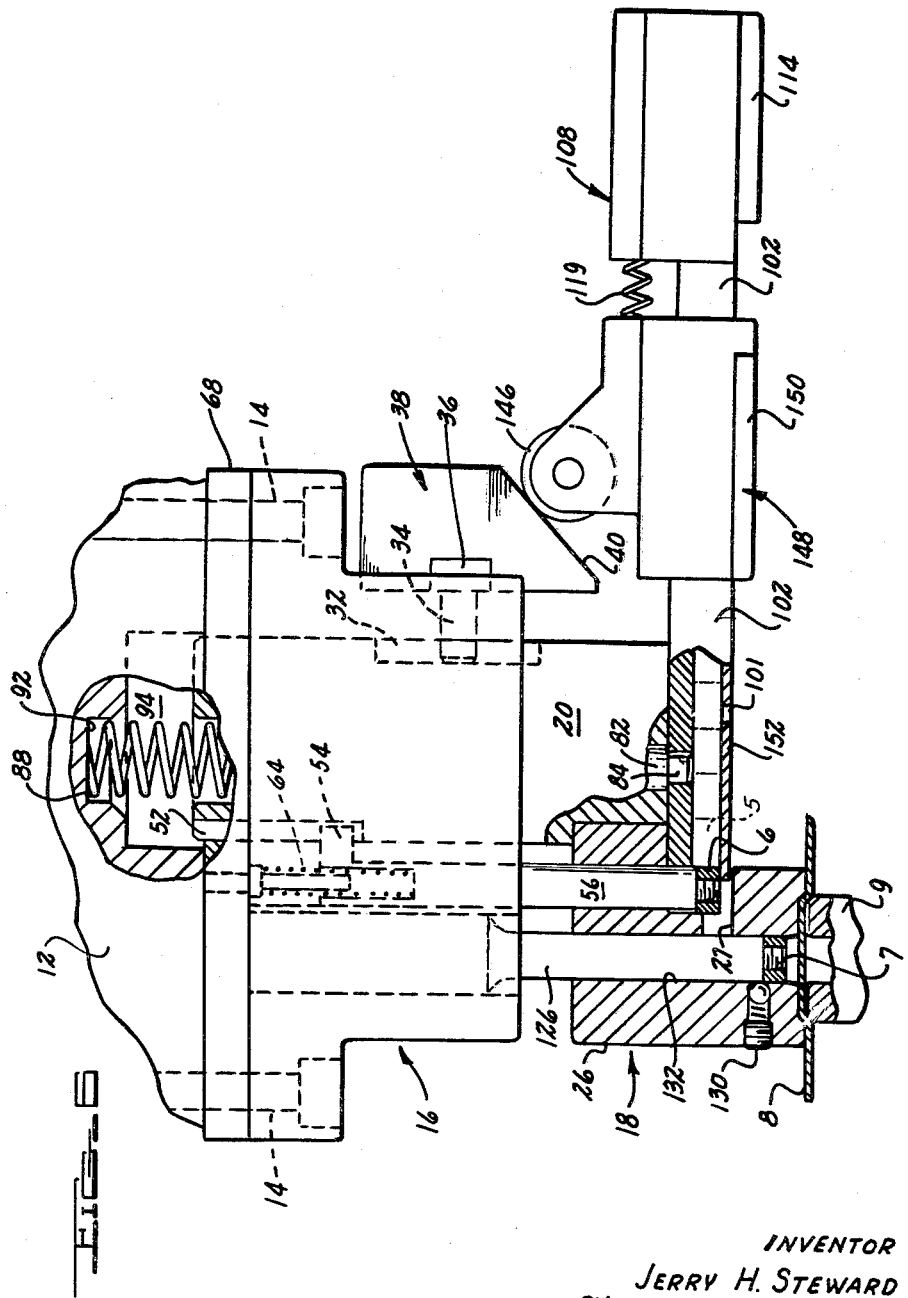

Oct. 29, 1963   J. H. STEWARD   3,108,368
METHOD OF SIZING AND INSTALLING A PIERCE NUT IN A PANEL
Original Filed March 25, 1957   6 Sheets-Sheet 5
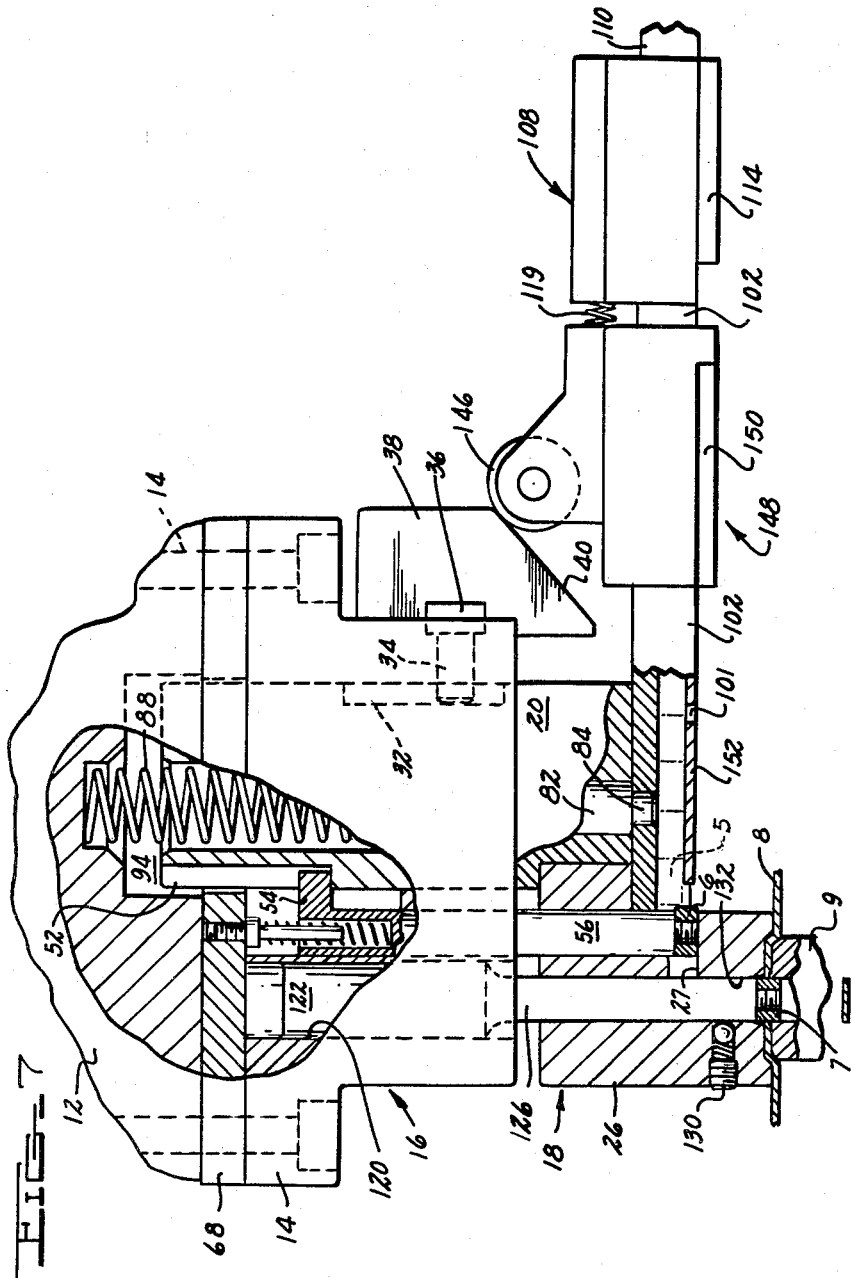
INVENTOR
JERRY H. STEWARD
BY
WILSON, SETTLE & CRAIG
ATTORNEYS Oct. 29, 1963 J. H. STEWARD 3,108,368
METHOD OF SIZING AND INSTALLING A PIERCE NUT IN A PANEL
Original Filed March 25, 1957 6 Sheets-Sheet 6
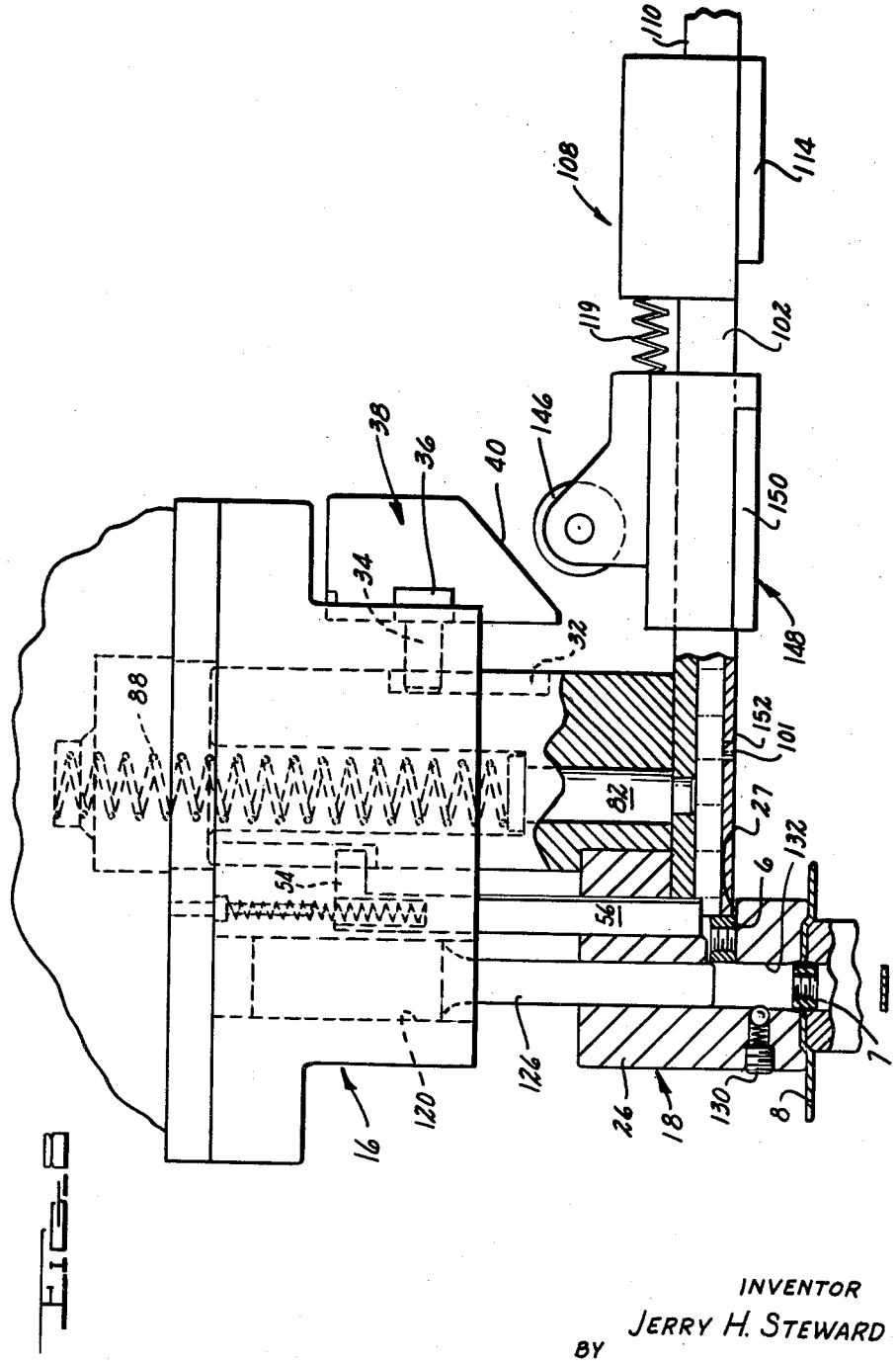
INVENTOR
JERRY H. STEWARD
BY
WILSON, SETTLE & CRAIG
ATTORNEYS

United States Patent Office 3,108,368
Patented Oct. 29, 1963

3,108,368
METHOD OF SIZING AND INSTALLING A PIERCE NUT IN A PANEL
Jerry H. Steward, Detroit, Mich., assignor to Multifastener Corporation, Redford, Mich.
Original application Mar. 25, 1957, Ser. No. 648,344, now Patent No. 3,089,360, dated May 14, 1963. Divided and this application Sept. 13, 1961, Ser. No. 140,160
6 Claims. (Cl. 29—432)

This invention relates to an improved method for affixing a clinch nut assembly to a sheet or panel.

In the past other devices of this nature have been developed using a nut or a similar part as a punch. However, the means used to hold the part prior to the affixing operation has not always proven entirely satisfactory. In most devices of this kind either a permanent magnet of a larger area than the part being held or an electromagnet of a similar area is provided for holding the part.

Metal chips are retained and remain in the threaded portion of the clinch nut as a result of the tapping operation. These chips are withdrawn once they come within the magnetic field of the clamping magnet, thus causing the succeeding parts to be spaced away from the surface of the clamping or holding magnet. The field intensity produced by a magnetic pole varies inversely with the square of the distance from the pole, and separation of the magnetic field from the clinch nut causes a reduction in the holding power of the magnet. This causes a shifting in position of the clinch nut when it is inserted under the magnet, which in turn causes serious misalignment of the parts. To correct this condition, production must stop so that the holding magnet can be cleaned to assure proper positioning of the successive parts. When such misalignment occurs, it is necessary to scrap the finished workpiece to which misaligned parts have been installed. Further, the misalignment may have been of such magnitude as to cause tool breakage. In today's era of mass production and labor and material cost, scrap, loss of production time, and replacement of tools create a very undesirable condition.

The present invention provides a method and apparatus for elimination of the above condition.

Thus when a magnetic device is used for holding a part, the part must be fed into an exact position under the punch with respect to the magnet, wherein the present invention provides a non-restricted loading area, into which are fed commercial tolerance parts. When a magnetic device is used, an undersize part is not properly located, while an oversize part will not fit into the restricted loading area.

In the present invention a loading area is provided, in which commercial tolerance parts are sized in a sizing area and since there is no built up tolerance in this area, all parts moving through this sizing area are precision parts and are readily and properly positioned and affixed to a panel.

Another object of the present invention is the provision of a method of assembly which effects sizing, positioning, piercing and swaging of a pierce nut in a panel in a single operation.

Yet another object of the present invention is the provision of a method utilizing a pierce nut to pierce an opening in a panel wherein standard size commercial tolerance nuts can be used.

The foregoing and related objects are accomplished by the provision of an apparatus using a clinch nut type fastener having an enlarged body and a reduced body shank. This apparatus comprises a punch; a mechanical means for moving and holding the fastener under the punch, the reduced body shank of the fastener forming a piercing member; a die having an opening disposed beneath the piercing member, a panel member being positioned between the die member and the punch, and said punch in operation moving the fastener downwardly to pierce the panel member and swage the fastener to the panel.

Other objects of this invention will appear in the following description and appended claims, reference being had to the accompanying drawings, forming a part of this specification, wherein like characters designate corresponding parts in the several views.

In the drawings:

FIGURE 1 is a cross sectional view of my apparatus, the apparatus being shown in a partially closed position with the die member removed.

FIGURE 2 is an enlarged section taken on line 2—2 in FIGURE 1 with the punch completely retracted.

FIGURE 3 is a fragmentary view of a modified punch.

FIGURE 4 is an elevational view taken in the direction of line 4—4, FIGURE 2.

FIGURE 5 is a bottom plan view of my apparatus.

FIGURE 6 is a side elevation, partly in section, showing an intermediate position as the apparatus moves downwardly.

FIGURE 7 is a view similar to FIGURE 6, showing the completely closed position of the apparatus.

FIGURE 8 is a view similar to FIGURE 7, showing an intermediate position of the apparatus moving upwardly.

FIGURE 9 is a cross section taken on line 9—9 of FIGURE 1.

FIGURE 10 is a cross section taken on line 10—10 of FIGURE 1.

FIGURE 11 is a cross section taken on line 11—11 of FIGURE 1.

FIGURE 12 is a perspective view of a finished workpiece, with the panel member partially broken away.

Before explaining the present invention in detail, it is to be understood that the invention is not limited in its application and details of construction and arrangement of parts illustrated in the accompanying drawings, since this invention is capable of other embodiments and of being practiced or carried out in various ways. Also, it is to be understood that the phraseology or terminology employed herein is for the purpose of description and not of limitation.

Referring to the drawings, FIGURE 1 illustrates a cross-sectional view of my feed head assembly embodying the invention. It will be readily understood that in the interest of simplicity, details of the hopper feed and the punch press have been omitted. Only the platen to which my device is affixed and the bed or anvil of the press will be referred to in the following specification, since this material is well known in the art and forms no part of the present invention.

The unit assembly 10 (FIGURE 1) embodying my invention is affixed to the platen 12 of the punch press with several cap screws 14. The unit assembly comprises several larger parts, namely the upper housing assembly 16, the lower housing assembly 18 and guide post 20. The lower portion of the guide post 20 has machined therein a flat section 22, which is recessed or undercut at the outer edges and is held in engagement with a nose piece 26 by means of cap screws 28. The above construction provides a joined relationship with respect to the nose piece 26 and the guide post 20. The upper part of the guide post 20 works within a bore 30 and has machined therein a key slot 32. This key slot 32 engages a retaining pin 34 which has a head portion 36. The pin 34 is held in engagement with the key slot 32 by means of a cam track member 38, which is secured to the upper housing assembly 16 with a cap screw 42. The cam track member 38 has an inclined face 40, and a forward edge 44 which is contained within a key slot 46 in the upper housing 16.

Diametrically opposite the key slot 32 in the guide post 20 is a key slot 52 which receives a key 54. The key 54 forms a part of the clinch nut ejector 56, which works within a bore 58 of the upper housing 16 and within a bore 60 in the nose piece 26. The ejector pin 56 has a spring retainer bore 62 which receives a spring 64. The opposite end of the spring 64 is retained on spring guide pin 66, which is secured to the spacer plate 68 between the press platen 12 and the upper housing 16. A lubrication hole 70 is provided in the upper housing 16 to provide adequate lubrication of the ejector pin 56 and the guide post 20.

The guide post 20 has an off-center bore 80 which receives a flanged pin member 82 that seats in the bottom of the bore 80 and extends downwardly into a second bore 90. The lower end of the flanged pin 82, has a reduced diameter 84 which engages the lock pin hole 100 in the clinch nut feed chute 102. A hole 101 is provided in the tucker 152 to permit easy removal of the feed chute 102. Seated on the flange 86 of the flange pin 82 is a spring 88 which is confined by the platen 12 of the press and seated within spring seat 92. A clearance opening 94 is provided in the platen 12 and the spaced plate 68 to permit upward movement of the guide post 12.

Housed in a bore 120 in the upper housing 16, is a punch 122 which is secured at the upper end to the spacer plate 68 by screw 124, the lower end of the punch member 126 being of reduced size and shape required to fit the design of the part used.

The nose piece 26, which forms a part of the lower housing 18, has therein a spring-loaded ball detent device 130, which prevents the clinch nut from turning on its edge in the machined opening 132, prior to the piercing operation. The opening 132 has a flared portion 133 which permits the free movement of the nose piece 18 with respect to part after installation of the part in a panel. Also within the nose piece 18 are two cam fingers 140 (see FIGURES 2 and 3) mounted on pivots 142, which engage the cam track 144 on the lower end of the punch 126.

The feed chute 102, which is retained by the flange pin 82 on the upper surface, is keyed to the lower portion of the guide post 20 by means of a dovetail 150, machined therein (see FIGURE 9). Slidably mounted on the feed chute 102, at the right of the guide post 20 is a roller type cam follower 146, which engages the cam track 40. Secured to the underside of the cam follower 146, is a tucker 148 (FIGURES 1 and 8) comprising a body portion 150 and a flat stem member 152 which works within the opening 104 of the feed chute 102. The tucker member 148 is secured to the cam follower 146 by means of two cap screws 106. On the right end of the feed chute 102 is an enlarged section 108 which is machined to receive the end of a hopper feed device 110. The end portion of the hopper feed device 110 has a hole which surrounds a pin 112, which is pressed into the cover member 114, to provide proper alignment of the parts supplied to the feed chute 102 from the hopper (not shown). The cover member 114 is secured by screws 116 to the enlarged section 108 of the feed chute 102. The enlarged section 108 of the feed chute and the cam follower 146, have machined therein a recess 118 to receive a compression spring 119. Having thus described the general construction and arrangement of parts, my device functions in the following manner.

With the workpiece or panel 8 in position over the die member 9 (FIGURE 6), the platen 12 moves downward, the entire assembly 10 moving until such time as the nose piece 26 strikes the workpiece or panel 8. As this occurs the lower housing assembly 18 stops and the cam follower 146 engages the cam track 40, thus causing a movement of the cam follower 146 to the right against the compression spring 119. This movement to the right starts the withdrawal of the tucker 152 from the underside of the clinch nut 6 (FIGURE 6). The spring-loaded clinch nut ejector pin 56 has now moved into engagement with the top of clinch nut 6, and the punch 126 has started to move the clinch nut 7, vertically down the sizing opening 132 in the nose piece 26. The guide post 20, has moved up a sufficient amount to start the compression of the spring 88 contained within the bore 80. As the punch 126 advances (FIGURE 2), the flange on the fastener 7 moves down against the protrusions 145 on the fingers 140, and rotates the fingers about their pivots 142. As this action is started, the protrusions 149 on the tops of the fingers 140 move inwardly toward the reduced portion 151 of the punch 126, and the fastener 7 is released.

As the platen 12 moves down still further (see FIGURE 6), the clinch nut 6 is about ready to be ejected over the end of the tucker stem 152. It will be noted that the ejector pin 56 has compressed the spring 64, and the tucker stem 152 remains partially under the clinch nut 6 and restrains its downward movement until the tucker stem is completely withdrawn.

When the unit assembly has reached its maximum downward movement (see FIGURE 7), the tucker stem 152 has been entirely withdrawn, and the clinch nut 6 has moved into engagement with the horizontal surface 27 of the nose piece 26. The ejector pin 56 blocks the opening from which the clinch nut 6 has come, and the next nut 5 is trying to enter. The clinch nut 7 is then advanced and sized in the opening 132 as the punch member 126 advances to pierce and stake or swage the clinch nut 7 into the workpiece 8. As the press advances the guide post 20 moves upward into the opening 94 and compresses the spring 88, while cam follower 146 is traversing the entire cam face 40.

During the retracting cycle, as the platen 12 moves up the cam follower 146 moves to the left on cam face 40 and is held in contact with the cam face 40 by the spring 119. This movement causes the tucker stem 152 to move the clinch nut 6 towards the punch 126 which is retracting. The punch 126 acts as a stop for the clinch nut 6 (see FIGURE 8) and consequently the engagement of the clinch nut 6 with the tucker stem 152 permits the cam face 40 to leave the cam follower 146. Once the punch 126 is completely withdrawn, the tucker 148 will snap the clinch nut 6 into position under the punch 126 and another cycle will take place.

The part 6 which is waiting to be moved under the punch 126 (FIGURE 7) when it has completely retracted, is about to be sized. The opening 132 in the nose piece 26 is of such width that it will receive an oversize clinch nut and precision size the same. With this in mind it can readily be seen that the part 7 which has been installed in the panel 8 is properly sized, this condition being possible because of the engagement of the tucker stem 152 and the clinch nut 7 against the nose piece wall before the punch 126 moved the part down the opening 132 (see FIGURE 4). The tucker stem 152 extending into the opening 132 holds the fastener, the extension of the tucker stem 152 being such that the action of the press moving cam 40 into engagement with the follower 146 moves the tucker stem 152 out of the way before the punch 126 engages it. By modifying the end of the punch 126a, as shown in FIGURE 3 of the drawings, a locking thread can be installed on the first few threads of the clinch nut. To accomplish this, a deformation of the threaded part is caused by placing an extension 125 on the punch, thus forcing the first few threads to be deformed when the punch strikes the die.

Since all movements are caused by press motion, it will be impossible to install half nuts on a panel with my device. All parts move by action of the tucker 152 and are spring-loaded against the wall 133 of the nose piece until moved by the punch 126. Should it be desirable to use multiple heads for nuts in various positions in a single panel, my device works very successfully.

The instant application is a division of my earlier filed application Serial No. 648,344, filed March 25, 1957, now Patent No. 3,089,360.

From the foregoing, it will be apparent that I have provided a unique method and apparatus which accomplish unusual results in a single step operation. The construction and arrangement of parts is such as to provide positive and efficient operation.

I claim:

1. The method of installing in a panel a pierce nut of a size lying within commercial tolerance limits and yet oversized relative to a nominal dimension, comprising the steps of securing the panel between a die member and a massive feed head having a longitudinal bore of a cross-sectional size and shape corresponding to the nominal dimension of the nut, positioning a nut in the feed head bore in spaced relation to the panel, and in a single uninterrupted motion advancing a punch through the bore (1) to displace the nut through the massive feed head bore to size the nut to nominal dimensions by its contact with the bore-defining feed head and (2) to force the nut through the panel.

2. In a method of installing pierce nuts in a panel by a punch press operation, the nuts being of a size within commercial tolerances and yet at least some of the nuts being oversized relative to nominal dimensions, the oversized portions of the nuts lying in planes normal to the axes of the nut threads, the steps of moving the nuts in succession into a feed head having a bore aligned with the press punch, the feed head bore being accurately sized to said nominal dimensions, and, with a single stroke of the press punch, advancing the nut through the feed head bore in a direction aligned with the nut thread axis, contact between the bore-defining portions of the feed head and the nut sizing to nominal dimensions those nuts which are oversized, and forcing the nut through a panel lying in the press in alignment with the feed bore.

3. In a method of installing in a sheet metal panel a nut manufactured within commercial tolerances and oversized relative to a desired nominal dimension by securing the panel in position in a press, the panel being interposed between and in alignment with a press punch and a formig die, the steps of positioning the nut in a punch guide bore intermediate the panel and the punch, the bore being defined by massive peripheral walls spaced from one another through distances conforming to the nominal dimensions of the nut, advancing the punch toward the panel to displace the nut through the bore in contact with said walls to size the nut to said nominal dimensions prior to forcing the nut through the panel, and continuing to advance the nut to force the sized nut through the panel and into cooperation with the press forming die.

4. In a method of installing in a sheet metal panel a nut manufactured within commercial tolerances and oversized relative to a desired nominal dimension, the steps of securing the panel in position in a press, the panel being interposed between and in alignment with a press punch and a forming die, positioning the nut in a punch bore intermediate the panel and the punch, the bore being of a size and configuration conforming to the nominal dimensions of the nut, and advancing the punch toward the panel in a single uninterrupted punch stroke (1) to advance the nut through the bore in contact therewith to size the nut to said nominal dimensions prior to forcing the nut through the panel, and (2) to force the sized nut through the panel and into cooperation with the press forming die.

5. In a method of installing pierce nuts in a panel by a punch press operation, the nuts being within commercial tolerance limitations and at least some of the nuts having those portions thereof lying in a plane normal to the axis of the nut threads oversized relative to nominal dimensions, the steps of moving the nuts individually in succession and in a direction transverse to their thread axes into a feed bore aligned with the press punch, the feed bore being accurately sized to said nominal dimensions about a longitudinal axis coincident with the axis of the nut threads, advancing the press punch through the bore (1) to displace the nut longitudinally through the bore in a direction aligned with the nut thread axis, contact between the feed bore and the nut accurately sizing to nominal dimensions those nuts which are oversized, and (2) to force the nut through a panel lying in the press in alignment with the feed bore.

6. The method of installing in a panel a pierce nut lying within commercial tolerance limits and having portions thereof oversized relative to a nominal dimension, comprising the steps of interposing the panel between a die member and a feed head having a longitudinal bore of a cross-sectional size and shape corresponding to the nominal dimensions of the nut portions, positioning a nut in the bore intermediate the panel and a punch reciprocal in said bore, and in a single uninterrupted motion of the punch toward the panel (1) forcing the nut through the feed head bore to size the nut to the nominal dimensions of the bore, and (2) forcing the nut through the panel for cooperation with the die member.

References Cited in the file of this patent

UNITED STATES PATENTS 2,328,821    Lyon _____ Sept. 7, 1943